(12) United States Patent
Bai et al.

(10) Patent No.: US 11,751,072 B2
(45) Date of Patent: Sep. 5, 2023

(54) USER EQUIPMENT BEHAVIOR WHEN USING MACHINE LEARNING-BASED PREDICTION FOR WIRELESS COMMUNICATION SYSTEM OPERATION

(71) Applicant: QUALCOMM Incorporated, San Diego, CA (US)

(72) Inventors: Tianyang Bai, Somerville, NJ (US); Hua Wang, Basking Ridge, NJ (US); Jung Ho Ryu, Fort Lee, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/304,639

(22) Filed: Jun. 23, 2021

(65) Prior Publication Data
US 2021/0410219 A1    Dec. 30, 2021

Related U.S. Application Data

(60) Provisional application No. 63/043,338, filed on Jun. 24, 2020.

(51) Int. Cl.
*G06N 20/00* (2019.01)
*H04B 17/24* (2015.01)
(Continued)

(52) U.S. Cl.
CPC ............ *H04W 16/22* (2013.01); *G06N 20/00* (2019.01); *H04B 17/24* (2015.01); *H04B 17/3913* (2015.01); *H04L 41/16* (2013.01);

*H04L 43/16* (2013.01); *H04W 24/06* (2013.01); *H04W 24/10* (2013.01); *H04W 72/12* (2013.01);
(Continued)

(58) Field of Classification Search
CPC .......... G06N 20/00–20; H04B 7/02–12; H04B 17/0082–3913; H04L 41/14–26; H04L 43/02–55; H04W 8/22–245; H04W 16/22–225; H04W 24/02–10; H04W 28/02–26; H04W 36/0005–385; H04W 72/005–14; H04W 76/10–50;
(Continued)

(56) References Cited

U.S. PATENT DOCUMENTS

2013/0109322 A1* 5/2013 Hapsari ................. H04W 24/10
2020/0344314 A1* 10/2020 Mellqvist .............. H04W 24/10
(Continued)

FOREIGN PATENT DOCUMENTS

WO    WO-2021064275 A1 *  4/2021    ............ H04W 24/10
WO    WO-2021201762 A1 * 10/2021    ............ H04W 24/10

*Primary Examiner* — Timothy J Weidner
(74) *Attorney, Agent, or Firm* — Harrity & Harrity, LLP

(57) ABSTRACT

Various aspects of the present disclosure generally relate to wireless communication. In some aspects, a user equipment may identify a failure associated with a machine learning prediction for one or more network parameters; report, to a base station, failure information regarding the failure associated with the machine learning prediction; receive, from the base station, response information identifying an alteration to a communication configuration as a response to the failure associated with the machine learning prediction; and implement the alteration to the communication configuration based at least in part on receiving the response information. Numerous other aspects are provided.

30 Claims, 8 Drawing Sheets

(51) Int. Cl.
*H04B 17/391* (2015.01)
*H04L 41/16* (2022.01)
*H04L 43/16* (2022.01)
*H04W 16/22* (2009.01)
*H04W 24/06* (2009.01)
*H04W 24/10* (2009.01)
*H04W 72/12* (2023.01)
*H04W 76/18* (2018.01)
*H04W 76/25* (2018.01)
*H04W 84/02* (2009.01)
*H04W 88/02* (2009.01)
*H04W 88/08* (2009.01)
*H04W 92/02* (2009.01)
*H04W 92/10* (2009.01)
*H04W 72/50* (2023.01)

(52) U.S. Cl.
CPC ........... *H04W 72/50* (2023.01); *H04W 76/18* (2018.02); *H04W 76/25* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC . H04W 84/005–22; H04W 88/005188; H04W 92/02–04; H04W 92/10
See application file for complete search history.

(56) References Cited

U.S. PATENT DOCUMENTS

2021/0326726 A1* 10/2021 Wang ................... H04W 24/10
2021/0390434 A1* 12/2021 Bai ....................... H04W 24/10
2022/0335337 A1* 10/2022 Kovacs ................. H04W 24/10

* cited by examiner

USER EQUIPMENT BEHAVIOR WHEN USING MACHINE LEARNING-BASED PREDICTION FOR WIRELESS COMMUNICATION SYSTEM OPERATION

CROSS-REFERENCE TO RELATED APPLICATION

This patent application claims priority to U.S. Provisional Patent Application No. 63/043,338, filed on Jun. 24, 2020, entitled "USER EQUIPMENT BEHAVIOR WHEN USING MACHINE LEARNING-BASED PREDICTION FOR WIRELESS COMMUNICATION SYSTEM OPERATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques for management of user equipment behavior when using machine learning-based prediction for wireless communication system operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a failure associated with a machine learning prediction for one or more network parameters; reporting, to a base station, failure information regarding the failure associated with the machine learning prediction; receiving, from the base station, response information identifying an alteration to a communication configuration as a response to the failure associated with the machine learning prediction; and implementing the alteration to the communication configuration based at least in part on receiving the response information.

In some aspects, a method of wireless communication performed by a base station includes receiving, from a UE, a report of failure information regarding a failure associated with a machine learning prediction for determining one or more network parameters; and transmitting, to the UE, response information identifying an alteration to a communication configuration as a response to the failure associated with the machine learning prediction.

In some aspects, a UE for wireless communication includes a memory and one or more processors coupled to the memory, the memory and the one or more processors configured to: identify a failure associated with a machine learning prediction for one or more network parameters; report, to a base station, failure information regarding the failure associated with the machine learning prediction; receive, from the base station, response information identifying an alteration to a communication configuration as a response to the failure associated with the machine learning prediction; and implement the alteration to the communication configuration based at least in part on receiving the response information.

In some aspects, a base station for wireless communication includes a memory and one or more processors coupled to the memory, the memory and the one or more processors configured to: receive, from a UE, a report of failure information regarding a failure associated with a machine learning prediction; and transmit, to the UE, response information identifying an alteration to a communication configuration as a response to the failure associated with the machine learning prediction.

In some aspects, a non-transitory computer-readable medium storing one or more instructions for wireless communication includes one or more instructions that, when executed by one or more processors of a UE, cause the one or more processors to: identify a failure associated with a machine learning prediction for one or more network parameters; report, to a base station, failure information regarding the failure associated with the machine learning prediction; receive, from the base station, response information identifying an alteration to a communication configuration as a response to the failure associated with the machine learning prediction; and implement the alteration to the communication configuration based at least in part on receiving the response information.

In some aspects, a non-transitory computer-readable medium storing one or more instructions for wireless communication includes one or more instructions that, when executed by one or more processors of a base station, cause the one or more processors to: receive, from a UE, a report of failure information regarding a failure associated with a machine learning prediction; and transmit, to the UE, response information identifying an alteration to a communication configuration as a response to the failure associated with the machine learning prediction.

In some aspects, an apparatus for wireless communication includes means for identifying a failure associated with a machine learning prediction for one or more network parameters; means for reporting, to a base station, failure information regarding the failure associated with the machine learning prediction; means for receiving, from the base station, response information identifying an alteration to a communication configuration as a response to the failure associated with the machine learning prediction; and means for implementing the alteration to the communication configuration based at least in part on receiving the response information.

In some aspects, an apparatus for wireless communication includes means for receiving, from a UE, a report of failure information regarding a failure associated with a machine learning prediction; and means for transmitting, to the UE, response information identifying an alteration to a communication configuration as a response to the failure associated with the machine learning prediction.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in mam different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
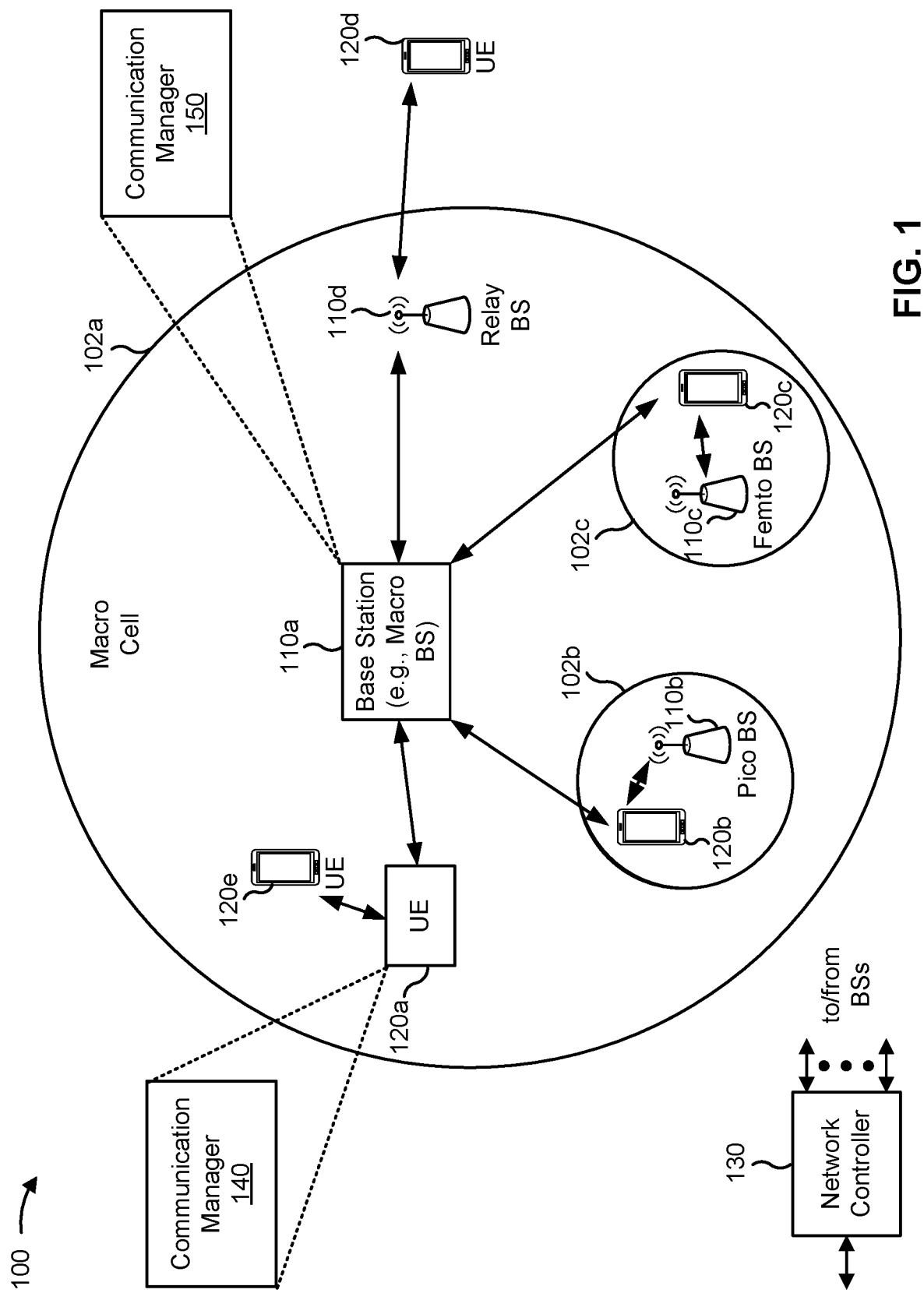
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

Abase station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a failure associated with a machine learning prediction for one or more network parameters; report, to a base station, failure information regarding the failure associated with the machine learning prediction; receive, from the base station, response information identifying an alteration to a communication configuration as a response to the failure associated with the machine learning prediction; and implement the alteration to the communication configuration based at least in part on receiving the response information. Additionally, or alternatively, the communication manager 140 may perform one or more other operations described herein.

In some aspects, the base station 110 may include a communication manager 150. As described in more detail elsewhere herein, the communication manager 150 may receive, from a UE, a report of failure information regarding a failure associated with a machine learning prediction for determining one or more network parameters; and transmit, to the UE, response information identifying an alteration to a communication configuration as a response to the failure associated with the machine learning prediction. Additionally, or alternatively, the communication manager 150 may perform one or more other operations described herein.

As indicated above, FIG. 1 is provided as an example. Other examples may differ from what is described with regard to FIG. 1.

Figure 2:
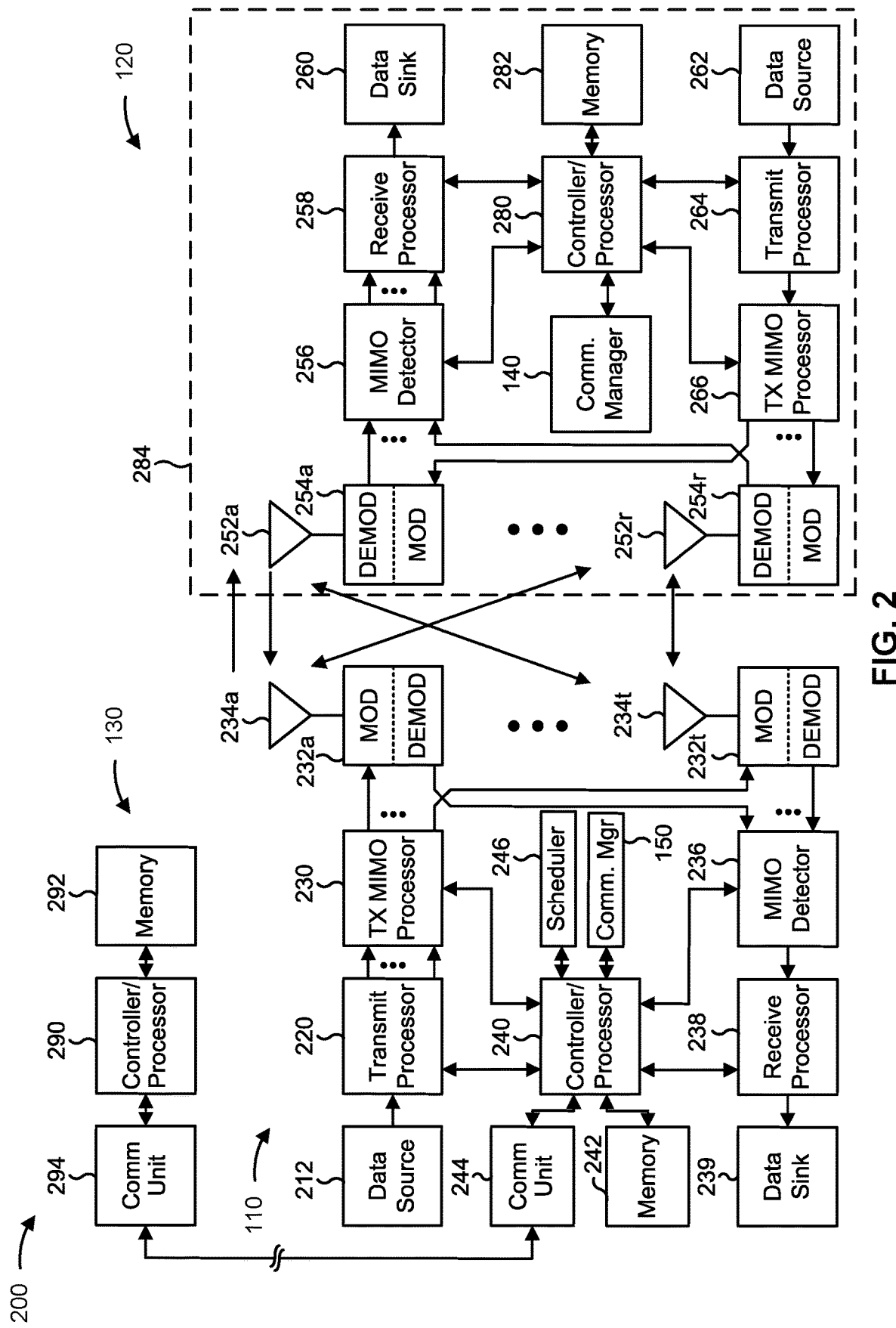
FIG. 2 is a diagram illustrating an example of abase station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-6).

The controller/processor 240 of the base station 110, the controller/processor 280 of the UE 120, and/or other component(s) of FIG. 2 may perform one or more techniques associated with UE behavior when using machine learning-based prediction for wireless communication system operation, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE (e.g., UE 120) includes means for identifying a failure associated with a machine learning prediction for one or more network parameters; means for reporting, to a base station, failure information regarding the failure associated with the machine learning prediction; means for receiving, from the base station, response information identifying an alteration to a communication configuration as a response to the failure associated with the machine learning prediction; and/or means for implementing the alteration to the communication configuration based at least in part on receiving the response information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for receiving, from a UE, a report of failure information regarding a failure associated with a machine learning prediction for determining one or more network parameters; and/or means for transmitting, to the UE, response information identifying an alteration to a communication configuration as a response to the failure associated with the machine learning prediction. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above. FIG. 2 is provided as an example. Other examples may differ from what is described with regard to FIG. 2.

Figure 3:
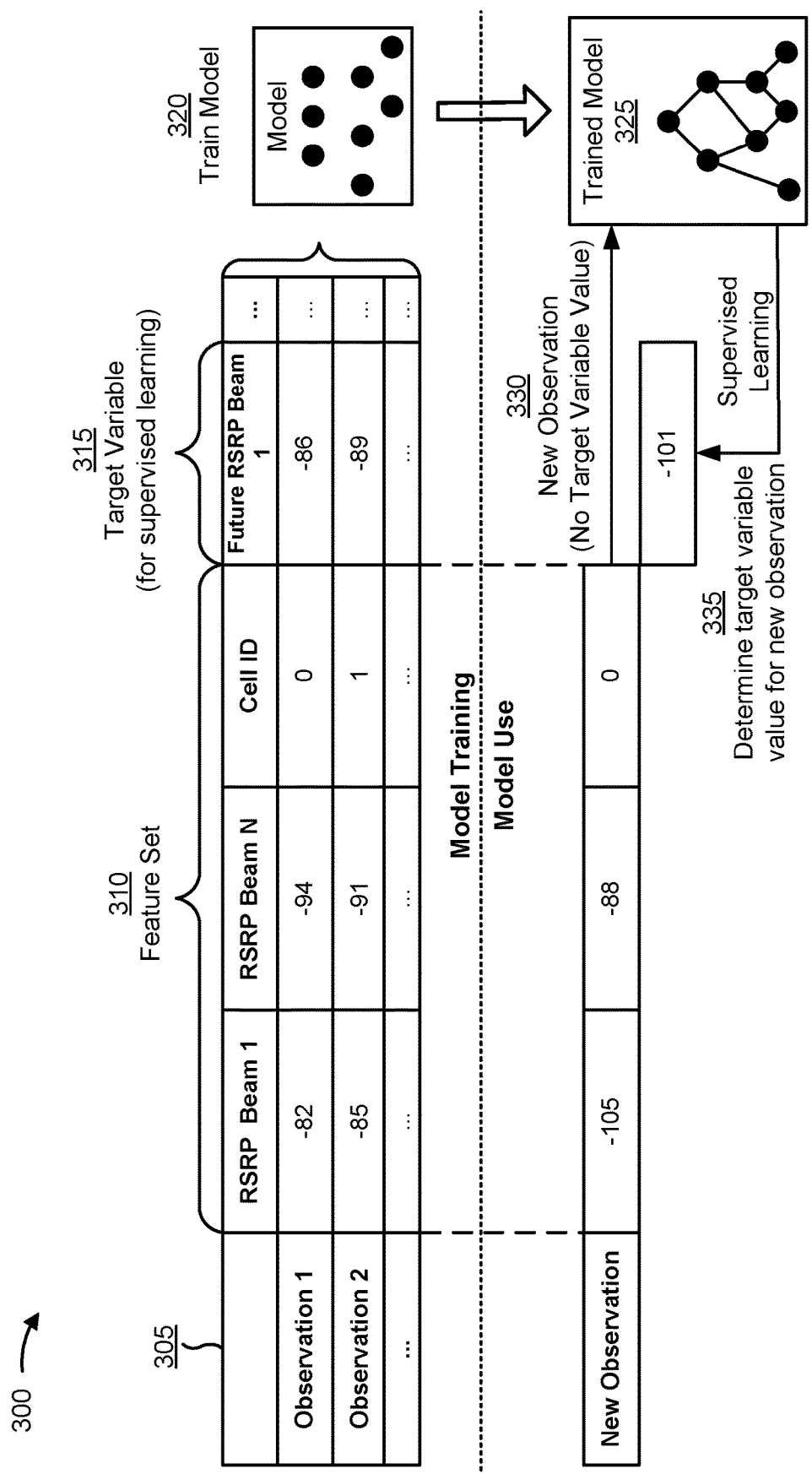
FIG. 3 is a diagram illustrating an example of training and using a machine learning model, in accordance with the present disclosure.

FIG. 3 is a diagram illustrating an example 300 of training and using a machine learning model in connection with wireless communication system operation. The machine learning model training and usage described herein may be performed using a machine learning system. The machine learning system may include or may be included in a computing device, a server, a cloud computing environment, and/or the like, such as the UE 120, described in more detail elsewhere herein.

As shown by reference number 305, a machine learning model may be trained using a set of observations. The set of observations may be obtained from historical data, such as data gathered during one or more processes described herein. The machine learning system may receive the set of observations (e.g., as input) from UE 120, base station 110, and/or the like, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. The machine learning system may determine variables for a set of observations and/or variable values for a specific observation based on input received from UE 120, base station 110, and/or the like. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a reference signal received power (RSRP) of a first beam, a second feature of an RSRP of an nth beam, a third feature of a cell identifier of a cell in which the RSRPs of the first through nth beams is determined, and so on. As shown, for a first observation, the first feature may have a value of −82 decibels (dB), the second feature may have a value of −94, the third feature may have a value of 0, and so on. These features and feature values are provided as examples, and may differ in other examples. For example, the feature set may include one or more of the following features: a reference signal received quality (RSRQ), a received signal strength indicator (RSSI), a UE identifier, a time increment, a frequency, and/or the like.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 300, the target variable is a future RSRP for the first beam, which has a value of −86 dB for the first observation. In this case, the future RSRP for the first beam may represent a change from the RSRP of the first beam in the feature set after a period of time. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

The machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of an RSRP of the first beam, a second feature of the RSRP of the nth beam, a third feature of the cell identifier, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 325 may predict a value of −101 dB for the target variable of a future RSRP for the first beam for the new observation, as shown by reference number 335. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a selection of a beam for use in communication (e.g., selecting the first beam based at least in part on the predicted RSRP for the first beam). The first automated action may include, for example, communicating with base station 110 to confirm selection of the first beam for communication.

The recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

The recommendations, actions, and clusters described above are provided as examples, and other examples may differ from what is described above. For example, the recommendations associated with network operation may include selecting whether to use the first beam, a second beam, . . . , the nth beam, and/or the like.

In this way, the machine leaning system may apply a rigorous and automated process to network operation and, more particularly, to prediction of network parameters for, for example, beam selection. The machine learning system enables recognition and/or identification of tens, hundreds, thousands, or millions of features and/or feature values for tens, hundreds, thousands, or millions of observations, thereby increasing accuracy and consistency associated with network operation relative to using static rules for network operation and/or forgoing use of predictions for network operation.

As indicated above, FIG. 3 is provided as an example. Other examples may differ from what is described in connection with FIG. 3.

As described above, a UE may use a machine learning algorithm (e.g., a neural network) to predict and/or estimate a network parameter, such as by using past channel measurements to predict future channel measurements. For example, the UE may use past RSRP measurements associated with a plurality of different beams in a cell to predict a future RSRP value for a beam in the cell. A base station may configure the UE with certain parameters to enable use of the machine learning algorithm. For example, the base station may provide trained algorithm parameters for a particular cell to allow a UE, which has entered the particular cell, to configure the machine learning algorithm for use in the particular cell.

However, at times, the machine learning algorithm may fail to accurately perform predictions. For example, when parameters provided to the UE are poorly trained for the cell (e.g., as a result of insufficient training data), the UE may fail to perform accurate predictions using the machine learning algorithm. Similarly, changes associated with a cell may affect an accuracy of the machine learning algorithm. For example, new construction of a building within an area covered by a cell may result in changes to signal propagation in the cell. In this case, a machine learning algorithm, trained on data from before the new construction, may be inaccurate when applied to observations collected after the new construction.

Some aspects described herein provide for UE behavior when using machine learning-based prediction for wireless communication system operation. For example, when the UE identifies one or more failures of a machine learning algorithm to produce accurate predictions, the UE may provide a failure report to the base station. In this case, the UE may receive response information from the base station associated with reconfiguring the machine learning algorithm (e.g., the base station may provide different parameters for the machine learning algorithm), falling back to non-machine learning-based wireless communication system operation, and/or the like. In this way, the UE avoids continuing to use a machine learning algorithm for prediction after observing a failure, which may have resulted in poor beam selection, poor utilization of network resources, and/or the like.

Figure 4:
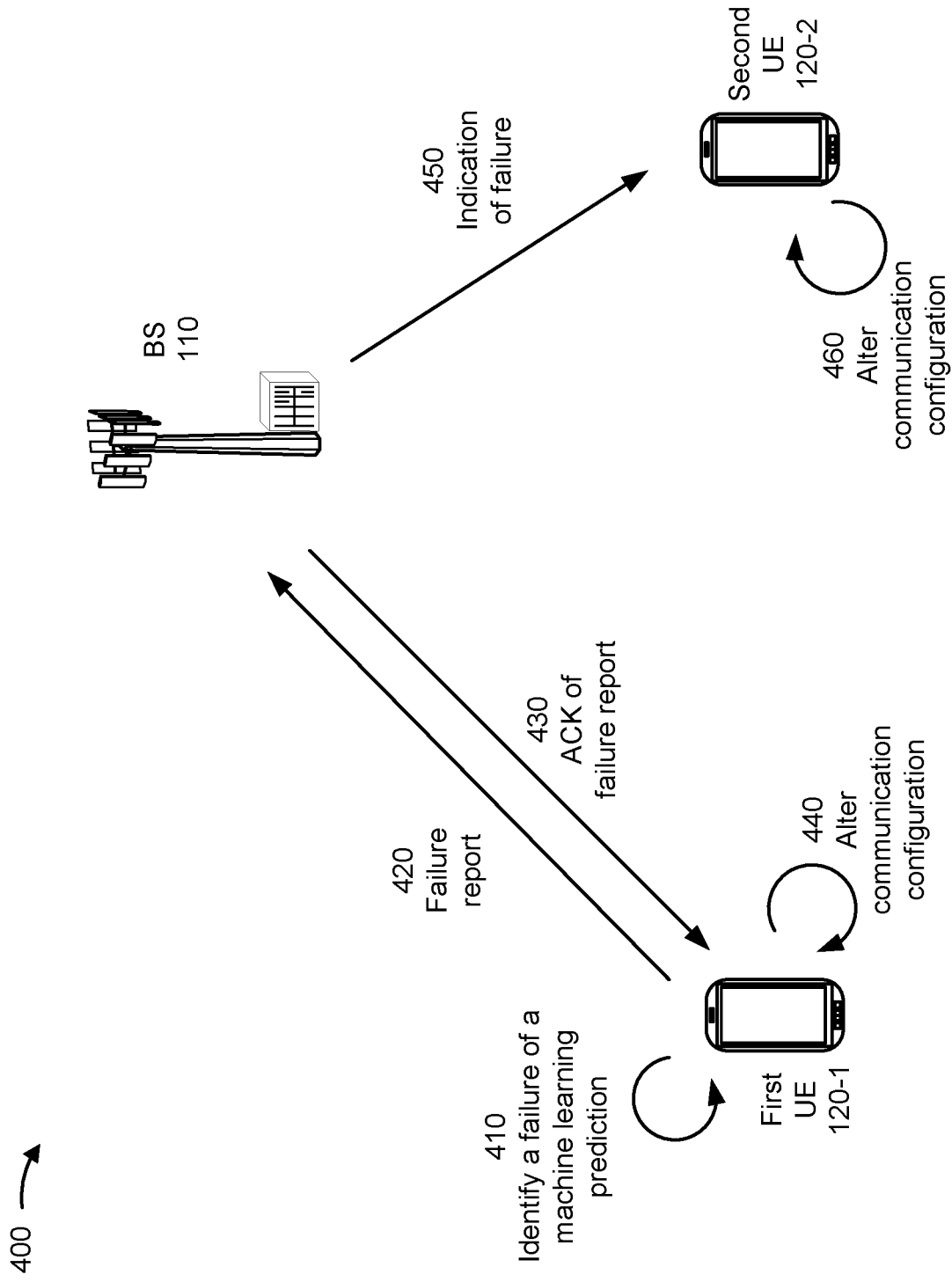
FIG. 4 is a diagram illustrating an example associated with UE behavior when using machine learning-based prediction for wireless communication system operation, in accordance with the present disclosure.

FIG. 4 is a diagram illustrating an example 400 of UE behavior when using machine learning-based prediction for wireless communication system operation, in accordance with the present disclosure. As shown in FIG. 4, example 400 includes a base station 110, a first UE 120-1, and a second UE 120-2.

As further shown in FIG. 4, and by reference number 410, first UE 120-1 may identify a failure of a machine learning prediction. For example, first UE 120-1 may determine that a predicted value, determined using a machine learning algorithm, differs from an observed value by a threshold amount. In this case, first UE 120-1 may use a machine learning algorithm to predict, at a first time, what an RSRP will be for a particular beam at a second time. At the second time, first UE 120-1 may determine the actual, observed RSRP for the particular beam, and may determine whether the predicted value for the RSRP differs from the observed RSRP by a threshold amount.

In some aspects, first UE 120-1 may identify a failure based at least in part on observing a particular quantity of instances of a prediction differing from an observation. For example, first UE 120-1 may determine that an observed RSRP differs from a predicted RSRP by a threshold amount during a threshold quantity of consecutive time intervals. Additionally, or alternatively, first UE 120-1 may determine that the observed RSRP differs from the predicted RSRP by a threshold amount during a threshold quantity of (consecutive or non-consecutive) time intervals within a threshold period of time. In some aspects, the quantity of instances or the length of the time interval may be based at least in part on an amount by which the predicted RSRP deviates from the observed RSRP. For example, when the amount of differential is a first value, first UE 120-1 may use a first quantity of instances, but when the amount of the differential is a second, larger value, first UE 120-1 may use a second, smaller quantity of instances.

As further shown in FIG. 4, and by reference number 420, first UE 120-1 may transmit a failure report to base station 110. For example, first UE 120-1 may transmit a message to convey failure information identifying the failure to base station 110. In some aspects, first UE 120-1 may include failure information identifying a set of characteristics of the identified failure. For example, the failure information may include information identifying a timing of an identified failure, a differential between a predicted and observed value, a set of inputs that triggered a failed prediction, a set of outputs included in the failed prediction, a predicted value, an observed value, and/or the like. In some aspects, first UE 120-1 may retransmit the failure information. For example, when first UE 120-1 does not receive an acknowledgement (ACK) of the failure information within a configured time duration, first UE 120-1 may retransmit the failure information. In this case, first UE 120-1 may use a fall back procedure while waiting for response information from base station 110, as described below.

In some aspects, first UE 120-1 may use a two-step message procedure to transmit the failure report. For example, first UE 120-1 may transmit a scheduling request (e.g., a bit indicator in a physical uplink control channel (PUSCH)) to base station 110 to trigger initiation of failure reporting. In this case, base station 110 may provide a physical downlink control channel (PDCCH) scheduling a resource with which first UE 120-1 transmits, in a medium access control (MAC) control element (CE) of another PUSCH, more detailed failure information (e.g., more detailed than the bit indicator, such as failure information including the predicted value, the observed value, and/or the like, as described above). In some aspects, first UE 120-1 may include, in the more detailed failure information, a new set of proposed parameters for the machine learning algorithm that result in a more accurate prediction. For example, first UE 120-1 may use the observed value to re-train the machine learning algorithm and obtain a new set of parameters for the machine learning algorithm. In this case, first UE 120-1 may transmit information identifying the new set of parameters for validation, for dissemination to other UEs 120, and/or the like.

As further shown in FIG. 4, and by reference numbers 430 and 440, first UE 120-1 may receive an ACK of the failure report and may alter a communication configuration. For example, first UE 120-1 may receive response information from base station 110 indicating that base station 110 received the failure information. In some aspects, base station 110 may provide response information identifying a new set of parameters for the machine learning algorithm. For example, base station 110 may confirm that a set of proposed parameters provided by first UE 120-1 are to be implemented. Additionally, or alternatively, base station 110 may provide a set of proposed parameters provided by another UE 120. Additionally, or alternatively, base station 110 may determine a set of parameters (e.g., by training a machine learning algorithm at base station 110, by combining multiple sets of proposed parameters, and/or the like) and provide the determined set of parameters.

In some aspects, base station 110 may provide response information indicating that first UE 120-1 it to take a response action. For example, base station 110 may cause first UE 120-1 to fall back to another procedure for controlling a wireless communication system. In some aspects, first UE 120-1 may start using a fall back procedure when the failure is identified and may continue using the fall back procedure until receiving information from base station 110 instructing first UE 120-1 to continue using the fall back procedure, restart using the machine learning algorithm, and/or the like. As an example, with regard to RSRP determination, base station 110 may cause UE 120 to use, for example, a fall back procedure for determining the RSRP, for selecting a beam based at least in part on the determined RSRP, and/or the like. In this case, the other procedure may include a non-prediction-based approach (e.g., a measurement-based approach), a different type of prediction-based approach, and/or the like. As another example, UE 120 may continue to use the machine learning algorithm for predictions, but may stop using the predictions for some decisions, such as for selecting a PDSCH receive beam.

As further shown in FIG. 4, and by reference numbers 450 and 460, base station 110 may transmit an indication of the failure, of a machine learning algorithm of first UE 120-1 to second UE 120-2 to cause second UE 120-2 to alter a communication configuration. For example, based at least in part on first UE 120-1 detecting and reporting the failure, base station 110 may cause a change to second UE 120-2 (e.g., which may be operating in the same cell, location, and/or the like as first UE 120-1). In this case, second UE 120-2 may alter a set of parameters used for a machine learning algorithm, fall back to another procedure for making a beam selection, and/or the like. In this way, base station 110 ensures that a detection of failures that affect a plurality of UEs 120 in an area is propagated to the plurality of UEs 120 in the area, thereby more rapidly stopping erroneous predictions than if each UE 120 had to detect failure separately.

In some aspects, base station 110 may determine whether the failure is applicable to second UE 120-2 before propagating the failure information to second UE 120-2. For example, base station 110 may determine that first UE 120-1 is undergoing a failure, but other UEs 120 in the area are not, which may indicate an error that is specific to first UE 120-1. In this case, base station 110 may forgo transmitting failure information to UE 120-2.

As indicated above. FIG. 4 is provided as an example. Other examples may differ from what is described with respect to FIG. 4.

Figure 5:
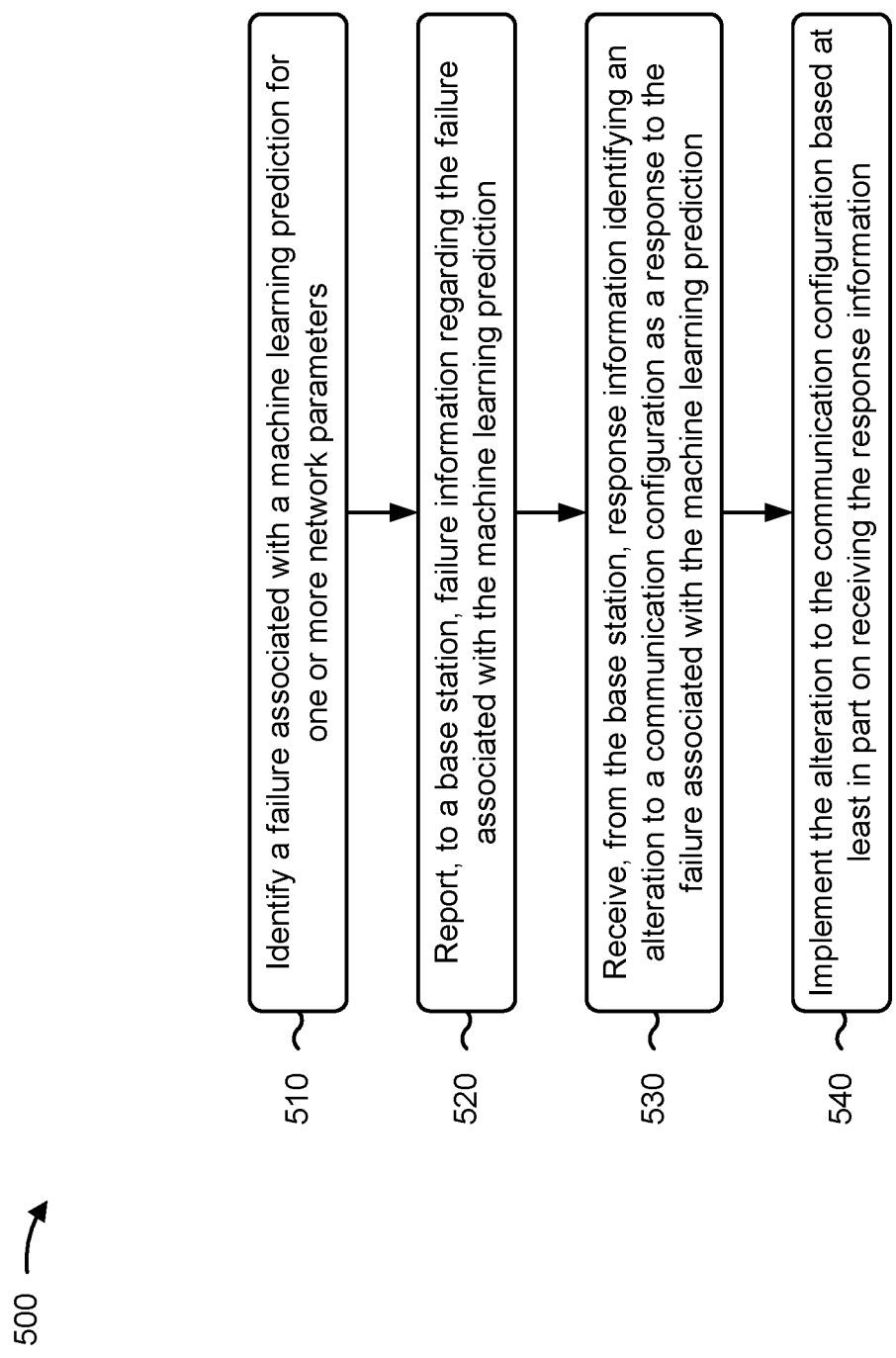
FIGS. 5-6 are diagrams illustrating example processes associated with UE behavior when using machine learning-based prediction for wireless communication system operation, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with user equipment behavior when using machine learning-based prediction for wireless communication system operation.

As shown in FIG. 5, in some aspects, process 500 may include identifying a failure associated with a machine learning prediction for one or more network parameters (block 510). For example, the UE (e.g., using receive processor 258, transmit processor 264, controller/processor 280, memory 282, and/or the like) may identify a failure associated with a machine learning prediction for one or more network parameters, as described above.

As further shown in FIG. 5, in some aspects, process 500 may include reporting, to a base station, failure information regarding the failure associated with the machine learning prediction (block 520). For example, the UE (e.g., using receive processor 258, transmit processor 264, controller/processor 280, memory 282, and/or the like) may report, to a base station, failure information regarding the failure associated with the machine learning prediction, as described above.

As further shown in FIG. 5, in some aspects, process 500 may include receiving, from the base station, response information identifying an alteration to a communication configuration as a response to the failure associated with the machine learning prediction (block 530). For example, the UE (e.g., using receive processor 258, transmit processor 264, controller/processor 280, memory 282, and/or the like) may receive, from the base station, response information identifying an alteration to a communication configuration as a response to the failure associated with the machine learning prediction, as described above.

As further shown in FIG. 5, in some aspects, process 500 may include implementing the alteration to the communication configuration based at least in part on receiving the response information (block 540). For example, the UE (e.g., using receive processor 258, transmit processor 264, controller/processor 280, memory 282, and/or the like) may implement the alteration to the communication configuration based at least in part on receiving the response information, as described above.

Process 500 may include additional aspects, such as any single aspect or any combination of aspects described below and/or in connection with one or more other processes described elsewhere herein.

In a first aspect, process 500 includes receiving parameter information or configuration information associated with configuring a machine learning model, and computing the machine learning prediction for the one or more network parameters based at least in part on receiving the parameter information or the configuration information.

In a second aspect, alone or in combination with the first aspect, identifying the failure associated with the machine learning prediction includes determining a differential between a predicted value for the one or more network parameters and an observed value for the one or more network parameters; determining that the differential satisfies a threshold, and identifying the failure associated with the machine learning prediction based at least in part on determining that the differential satisfies the threshold.

In a third aspect, alone or in combination with one or more of the first and second aspects, identifying the failure associated with the machine learning prediction includes determining a threshold quantity of occurrences of the differential satisfying the threshold within a threshold period of time, and identifying the failure associated with the machine learning prediction based at least in part on determining the threshold quantity of occurrences of the differential satisfying the threshold within the threshold period of time.

In a fourth aspect, alone or in combination with one or more of the first through third aspects, the failure information includes information identifying at least one of: the failure, a timing of the failure, an input that triggered the failure, an output from the failure, or an observed network parameter.

In a fifth aspect, alone or in combination with one or more of the first through fourth aspects, reporting the failure information includes transmitting a scheduling request; receiving downlink information identifying a grant for reporting, and transmitting the failure information using a resource identified in the grant.

In a sixth aspect, alone or in combination with one or more of the first through fifth aspects, the failure information includes information identifying a proposed set of network parameters associated with the failure.

In a seventh aspect, alone or in combination with one or more of the first through sixth aspects, reporting the failure information includes transmitting a first report of the failure information; monitoring to receive an acknowledgement of the first report of the failure information, and selectively transmit a second report of the failure information based at least in part on a result of monitoring to receive the acknowledgement of the first report of the failure information.

In an eighth aspect, alone or in combination with one or more of the first through seventh aspects, process 500 includes continuing to use a machine learning model to predict the one or more network parameters until implementing the alteration to the communication configuration.

In a ninth aspect, alone or in combination with one or more of the first through eighth aspects, process 500 includes forgoing one or more communication procedures during the continuing to use the machine learning model.

In a tenth aspect, alone or in combination with one or more of the first through ninth aspects, process 500 includes falling back to another procedure for determining the one or more network parameters based at least in part on identifying the failure associated with the machine learning prediction.

In an eleventh aspect, alone or in combination with one or more of the first through tenth aspects, falling back comprises: falling back based at least in part on at least one of: a pre-configured fall back configuration, or received signaling from the base station.

In a twelfth aspect, alone or in combination with one or more of the first through eleventh aspects, process 500 includes receiving, from the base station, information identifying an alteration to a configuration of a machine learning model; reconfiguring the machine learning model based at least in part on the information identifying the alteration to the configuration of the machine learning model; and using the machine learning model for a subsequent prediction based at least in part on reconfiguring the machine learning model.

In a thirteenth aspect, alone or in combination with one or more of the first through twelfth aspects, process 500 includes forgoing use of a machine learning model for predicting the one or more network parameters for a threshold period of time.

In a fourteenth aspect, alone or in combination with one or more of the first through thirteenth aspects, reporting the failure information comprises: reporting the failure information to cause an alteration to a configuration of another UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
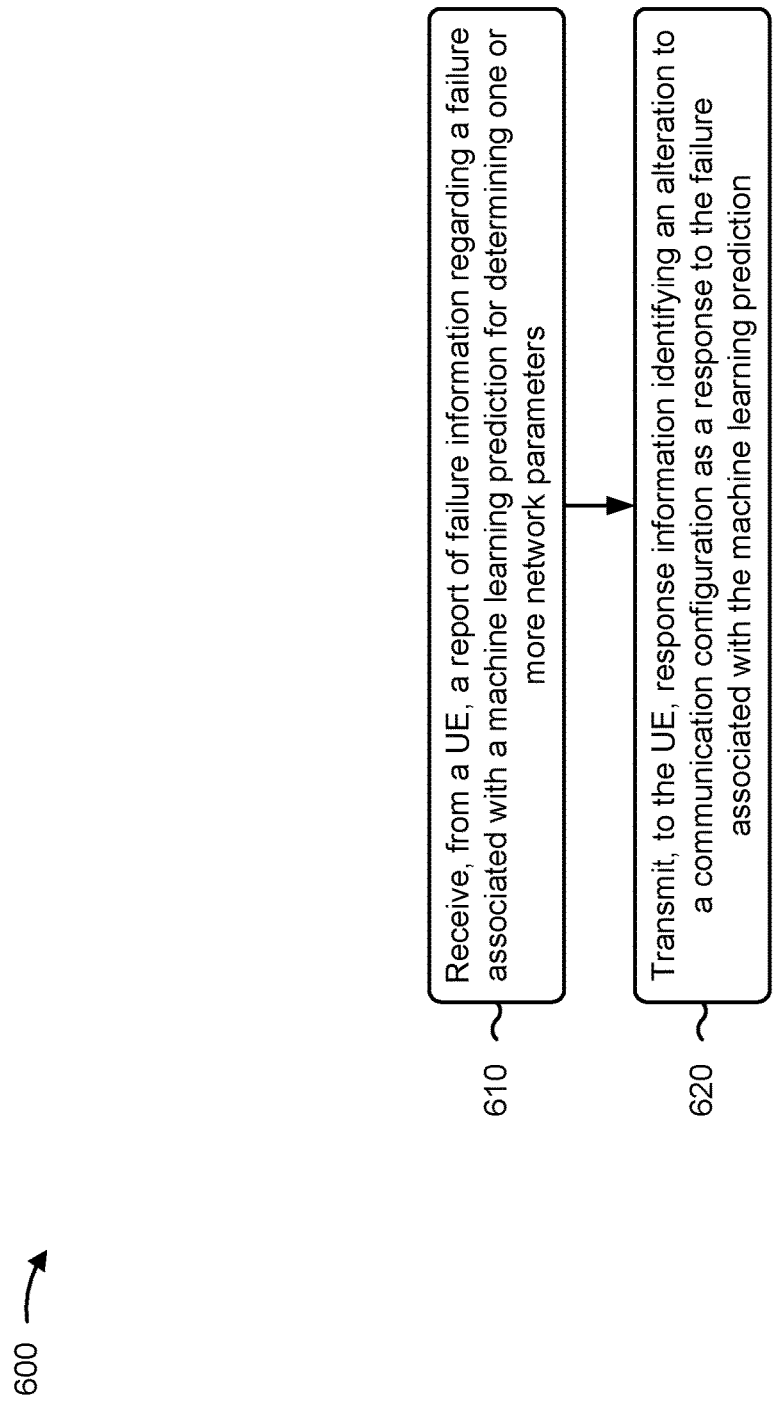

FIG. 6 is a diagram illustrating an example process 600 performed, for example, by a base station, in accordance with the present disclosure. Example process 600 is an example where the base station (e.g., base station 110 and/or the like) performs operations associated with user equipment behavior when using machine learning-based prediction for wireless communication system operation.

As shown in FIG. 6, in some aspects, process 600 may include receiving, from a UE, a report of failure information regarding a failure associated with a machine learning prediction for determining one or more network parameters (block 610). For example, the base station (e.g., using transmit processor 220, receive processor 238, controller/processor 240, memory 242, and/or the like) may receive, from a UE, a report of failure information regarding a failure associated with a machine learning prediction for determining one or more network parameters, as described above.

As further shown in FIG. 6, in some aspects, process 600 may include transmitting, to the UE, response information identifying an alteration to a communication configuration as a response to the failure associated with the machine learning prediction (block 620). For example, the base station (e.g., using transmit processor 220, receive processor 238, controller/processor 240, memory 242, and/or the like) may transmit, to the UE, response information identifying an alteration to a communication configuration as a response to the failure associated with the machine learning prediction, as described above.

Process 600 may include additional aspects, such as any single aspect or any combination of aspects described below and/or in connection with one or more other processes described elsewhere herein.

In a first aspect, process 600 includes transmitting parameter information or configuration information associated with configuring a machine learning model.

In a second aspect, alone or in combination with the first aspect, the failure information includes information identifying at least one of: the failure, a timing of the failure, an input that triggered the failure, an output from the failure, or an observed network parameter.

In a third aspect, alone or in combination with one or more of the first and second aspects, receiving the report of the failure information includes receiving a scheduling request; transmitting downlink information identifying a grant for reporting, and receiving the failure information using a resource identified in the grant.

In a fourth aspect, alone or in combination with one or more of the first through third aspects, the failure information includes information identifying a proposed set of network parameters associated with the failure.

In a fifth aspect, alone or in combination with one or more of the first through fourth aspects, process 600 includes transmitting signaling instructing the UE to fall back to another procedure for determining the one or more network parameters based at least in part on identifying the failure associated with the machine learning prediction.

In a sixth aspect, alone or in combination with one or more of the first through fifth aspects, process 600 includes transmitting, to the UE, information identifying an alteration to a configuration of a machine learning model.

In a seventh aspect, alone or in combination with one or more of the first through sixth aspects, process 600 includes transmitting information to another UE to adjust another communication configuration of the other UE.

In an eighth aspect, alone or in combination with one or more of the first through seventh aspects, transmitting the information to the other UE comprises: transmitting the information to the other UE based at least in part on receiving the failure information.

In a ninth aspect, alone or in combination with one or more of the first through eighth aspects, another report of failure information has not been received from the other UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
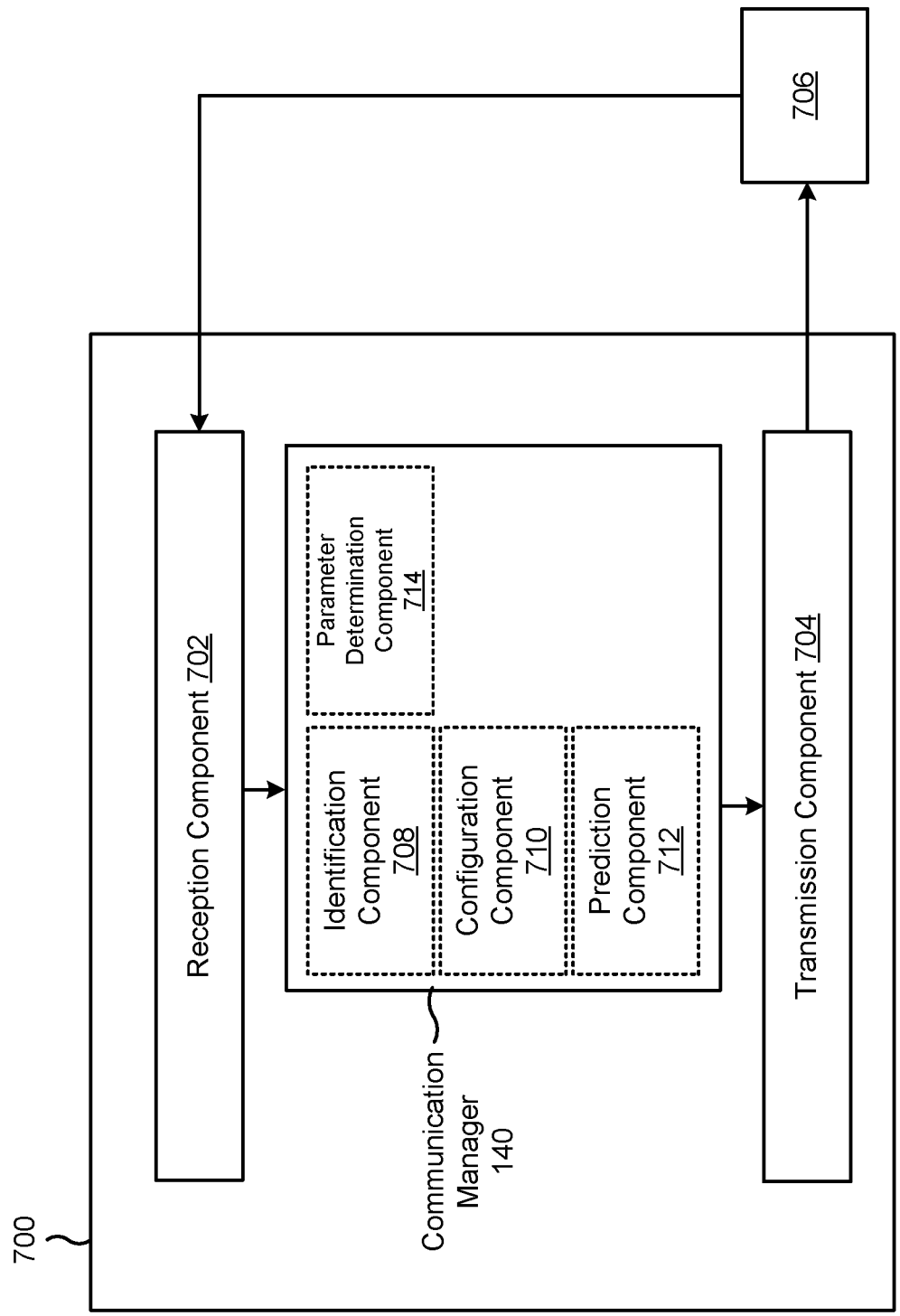
FIGS. 7-8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an identification component 708, a configuration component 710, a prediction component 712, or a parameter determination component 714, among other examples.

In some aspects, the apparatus 700 may be configured to perform one or more operations described herein in connection with FIGS. 3-6. Additionally, or alternatively, the apparatus 700 may be configured to perform one or more processes described herein, such as process 500 of FIG. 5 or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The identification component 708 may identify a failure associated with a machine learning prediction for one or more network parameters. The transmission component 704 may report, to a base station, failure information regarding the failure associated with the machine learning prediction. The reception component 702 may receive, from the BS, response information identifying an alteration to a communication configuration as a response to the failure associated with the machine learning prediction. The configuration component 710 may implement the alteration to the communication configuration based at least in part on receiving the response information.

The reception component 702 may receive parameter information or configuration information associated with configuring a machine learning model. The prediction component 712 may compute the machine learning prediction for the one or more network parameters based at least in part on receiving the parameter information or the configuration information. The prediction component 712 may continue to use a machine learning model to predict the one or more network parameters until implementing the alteration to the communication configuration. The reception component 702 or the transmission component 704 may forgo one or more communication procedures during the continuing to use the machine learning model. The parameter determination component 714 may fall back to another procedure for determining the one or more network parameters based at least in part on identifying the failure associated with the machine learning prediction.

The reception component 702 may receive, from the BS, information identifying an alteration to a configuration of a machine learning model. The prediction component 712 may reconfigure the machine learning model based at least in part on the information identifying the alteration to the configuration of the machine learning model. The prediction component 712 may use the machine learning model for a subsequent prediction based at least in part on reconfiguring the machine learning model. The parameter determination component 714 may forgo use of a machine learning model for predicting the one or more network parameters for a threshold period of time.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
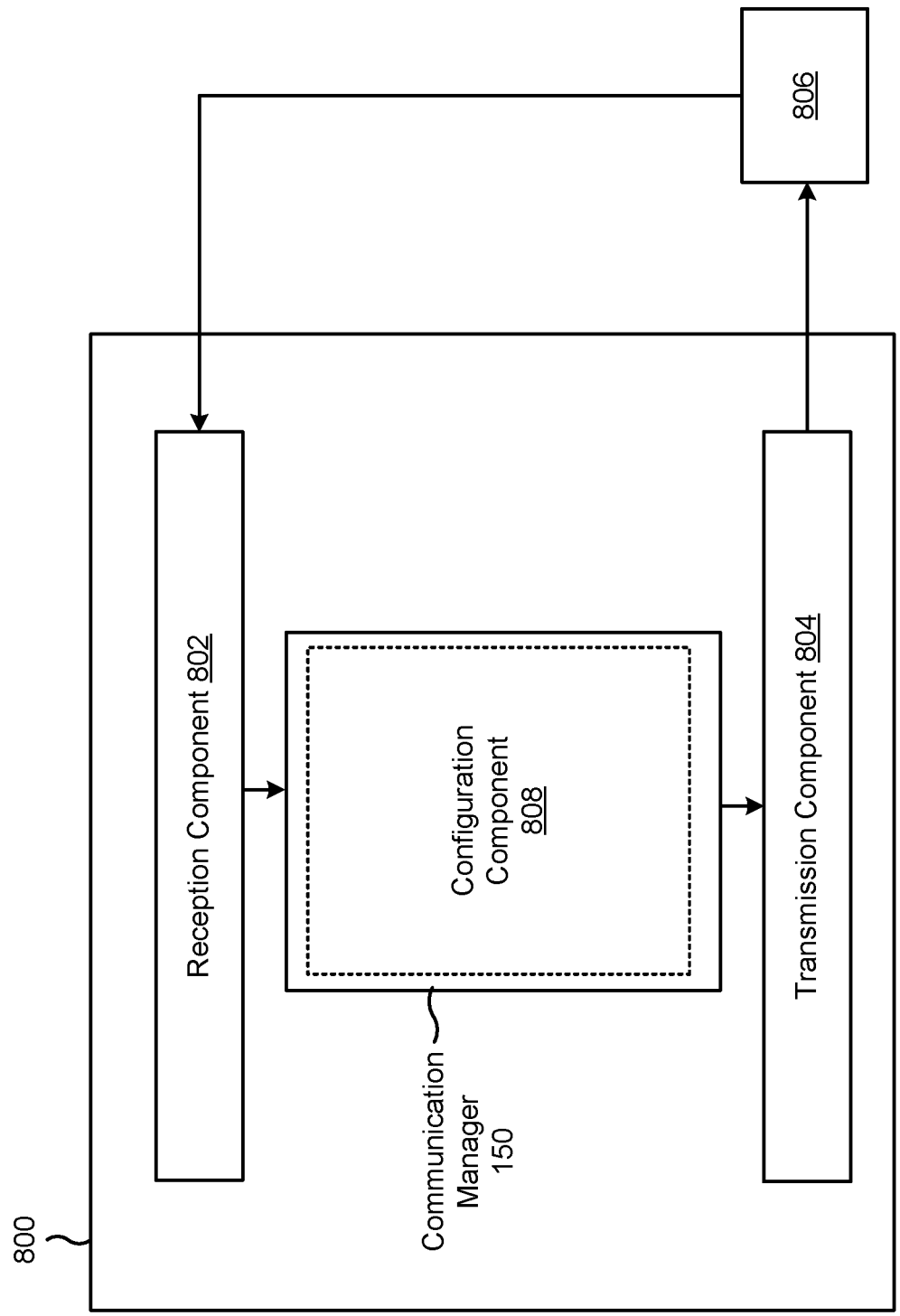

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a configuration component 808, among other examples.

In some aspects, the apparatus 800 may be configured to perform one or more operations described herein in connection with FIGS. 3-6. Additionally, or alternatively, the apparatus 800 may be configured to perform one or more processes described herein, such as process 600 of FIG. 6 or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The reception component 802 may receive, from a UE, a report of failure information regarding a failure associated with a machine learning prediction for determining one or more network parameters. The transmission component 804 may transmit, to the UE, response information identifying an alteration to a communication configuration as a response to the failure associated with the machine learning prediction.

The transmission component 804 may transmit parameter information or configuration information associated with configuring a machine learning model.

The transmission component 804 may transmit signaling instructing the UE to fall back to another procedure for determining the one or more network parameters based at least in part on identifying the failure associated with the machine learning prediction. The transmission component 804 may transmit, to the UE, information identifying an alteration to a configuration of a machine learning model. The transmission component 804 may transmit information to another UE to adjust another communication configuration of the other UE. The configuration component 808 may determine the configurations of the machine learning model.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally. or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: identifying a failure associated with a machine learning prediction for one or more network parameters; reporting, to a base station, failure information regarding the failure associated with the machine learning prediction; receiving, from the base station, response information identifying an alteration to a communication configuration as a response to the failure associated with the machine learning prediction; and implementing the alteration to the communication configuration based at least in part on receiving the response information.

Aspect 2: The method of Aspect 1, further comprising: receiving parameter information or configuration information associated with configuring a machine learning model; and computing the machine learning prediction for the one or more network parameters based at least in part on receiving the parameter information or the configuration information.

Aspect 3: The method of any of Aspects 1 to 2, wherein identifying the failure associated with the machine learning prediction comprises: determining a differential between a predicted value for the one or more network parameters and an observed value for the one or more network parameters; determining that the differential satisfies a threshold; and identifying the failure associated with the machine learning prediction based at least in part on determining that the differential satisfies the threshold.

Aspect 4: The method of Aspect 3, wherein identifying the failure associated with the machine learning prediction comprises: determining a threshold quantity of occurrences of the differential satisfying the threshold within a threshold period of time; and identifying the failure associated with the machine learning prediction based at least in part on determining the threshold quantity of occurrences of the differential satisfying the threshold within the threshold period of time.

Aspect 5: The method of any of Aspects 1 to 4, wherein the failure information includes information identifying at least one of: the failure, a timing of the failure, an input that triggered the failure, an output from the failure, or an observed network parameter.

Aspect 6: The method of any of Aspects 1 to 5, wherein reporting the failure information comprises: transmitting a scheduling request; receiving downlink information identifying a grant for reporting; and transmitting the failure information using a resource identified in the grant.

Aspect 7: The method of any of Aspects 1 to 6, wherein the failure information includes information identifying a proposed set of network parameters associated with the failure.

Aspect 8: The method of any of Aspects 1 to 7, wherein reporting the failure information comprises: transmitting a first report of the failure information; monitoring to receive an acknowledgement of the first report of the failure information; and selectively transmitting a second report of the failure information based at least in part on a result of monitoring to receive the acknowledgement of the first report of the failure information.

Aspect 9: The method of any of Aspects 1 to 8, further comprising: continuing to use a machine learning model to predict the one or more network parameters until implementing the alteration to the communication configuration.

Aspect 10: The method of Aspect 9, further comprising: forgoing one or more communication procedures during the continuing to use the machine learning model.

Aspect 11: The method of any of Aspects 1 to 10, further comprising: falling back to another procedure for determining the one or more network parameters based at least in part on identifying the failure associated with the machine learning prediction.

Aspect 12: The method of Aspect 11, wherein falling back comprises: falling back based at least in part on at least one of: a pre-configured fall back configuration, or received signaling from the BS.

Aspect 13: The method of any of Aspects 1 to 12, further comprising: receiving, from the BS, information identifying an alteration to a configuration of a machine learning model; reconfiguring the machine learning model based at least in part on the information identifying the alteration to the configuration of the machine learning model; and using the machine learning model for a subsequent prediction based at least in part on reconfiguring the machine learning model.

Aspect 14: The method of any of Aspects 1 to 13, further comprising: forgoing use of a machine learning model for predicting the one or more network parameters for a threshold period of time.

Aspect 15: The method of any of Aspects 1 to 14, wherein reporting the failure information comprises: reporting the failure information to cause an alteration to a configuration of another UE.

Aspect 16: A method of wireless communication performed by a base station, comprising: receiving, from a user equipment (UE), a report of failure information regarding a failure associated with a machine learning prediction for determining one or more network parameters; and transmitting, to the UE, response information identifying an alteration to a communication configuration as a response to the failure associated with the machine learning prediction.

Aspect 17: The method of Aspect 16, further comprising: transmitting parameter information or configuration information associated with configuring a machine learning model.

Aspect 18: The method of any of Aspects 16 to 17, wherein the failure information includes information identifying at least one of: the failure, a timing of the failure, an input that triggered the failure, an output from the failure, or an observed network parameter.

Aspect 19: The method of any of Aspects 16 to 18, wherein receiving the report of the failure information comprises: receiving a scheduling request; transmitting downlink information identifying a grant for reporting, and receiving the failure information using a resource identified in the grant.

Aspect 20: The method of any of Aspects 16 to 19, wherein the failure information includes information identifying a proposed set of network parameters associated with the failure.

Aspect 21: The method of any of Aspects 16 to 20, further comprising: transmitting signaling instructing the UE to fall back to another procedure for determining the one or more network parameters based at least in part on identifying the failure associated with the machine learning prediction.

Aspect 22: The method of any of Aspects 16 to 21, further comprising: transmitting, to the UE, information identifying an alteration to a configuration of a machine learning model.

Aspect 23: The method of any of Aspects 16 to 22, further comprising: transmitting information to another UE to adjust another communication configuration of the other UE.

Aspect 24: The method of Aspect 23, wherein transmitting the information to the other UE comprises: transmitting the information to the other UE based at least in part on receiving the failure information.

Aspect 25: The method of any of Aspects 23 to 24, wherein another report of failure information has not been received from the other UE.

Aspect 26: An apparatus for wireless communication at a device, comprising a processor, memory coupled with the processor; and instructions stored in the memory and executable by the processor to cause the apparatus to perform the method of one or more of Aspects 1-15.

Aspect 27: A device for wireless communication, comprising a memory and one or more processors coupled to the memory, the one or more processors configured to perform the method of one or more of Aspects 1-15.

Aspect 28: An apparatus for wireless communication, comprising at least one means for performing the method of one or more of Aspects 1-15.

Aspect 29: A non-transitory computer-readable medium storing code for wireless communication, the code comprising instructions executable by a processor to perform the method of one or more of Aspects 1-15.

Aspect 30: A non-transitory computer-readable medium storing a set of instructions for wireless communication, the set of instructions comprising one or more instructions that, when executed by one or more processors of a device, cause the device to perform the method of one or more of Aspects 1-15.

Aspect 31: An apparatus for wireless communication at a device, comprising a processor, memory coupled with the processor; and instructions stored in the memory and executable by the processor to cause the apparatus to perform the method of one or more of Aspects 16-25.

Aspect 32: A device for wireless communication, comprising a memory and one or more processors coupled to the memory, the one or more processors configured to perform the method of one or more of Aspects 16-25.

Aspect 33: An apparatus for wireless communication, comprising at least one means for performing the method of one or more of Aspects 16-25.

Aspect 34: A non-transitory computer-readable medium storing code for wireless communication, the code comprising instructions executable by a processor to perform the method of one or more of Aspects 16-25.

Aspect 35: A non-transitory computer-readable medium storing a set of instructions for wireless communication, the set of instructions comprising one or more instructions that, when executed by one or more processors of a device, cause the device to perform the method of one or more of Aspects 16-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein. "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   identify a failure associated with a machine learning prediction for one or more network parameters, wherein the one or more processors, to identify the failure associated with the machine learning prediction, are configured to:
   determine a differential between a predicted value for the one or more network parameters and an observed value for the one or more network parameters;
   determine that the differential satisfies a threshold;
   determine a threshold quantity of occurrences of the differential satisfying the threshold within a threshold period of time; and
   identify the failure associated with the machine learning prediction based at least in part on determining the threshold quantity of occurrences of the differential satisfying the threshold within the threshold period of time;
   report, to a base station, failure information regarding the failure associated with the machine learning prediction;
   receive, from the base station, response information identifying an alteration to a communication configuration as a response to the failure associated with the machine learning prediction; and
   implement the alteration to the communication configuration based at least in part on receiving the response information.

2. The UE of claim 1, wherein the one or more processors are further configured to:
   receive parameter information or configuration information associated with configuring a machine learning model; and
   compute the machine learning prediction for the one or more network parameters based at least in part on receiving the parameter information or the configuration information.

3. The UE of claim 1, wherein the failure information includes information identifying at least one of: the failure, a timing of the failure, an input that triggered the failure, an output from the failure, or an observed network parameter.

4. The UE of claim 1, wherein the one or more processors, to report the failure information, are configured to:
   transmit a scheduling request;
   receive downlink information identifying a grant for reporting; and
   transmit the failure information using a resource identified in the grant.

5. The UE of claim 1, wherein the failure information includes information identifying a proposed set of network parameters associated with the failure.

6. The UE of claim 1, wherein the one or more processors, to report the failure information, are configured to:
   transmit a first report of the failure information;
   monitor to receive an acknowledgement of the first report of the failure information; and
   selectively transmit a second report of the failure information based at least in part on a result of monitoring to receive the acknowledgement of the first report of the failure information.

7. The UE of claim 1, wherein the one or more processors are further configured to:
   continue to use a machine learning model to predict the one or more network parameters until implementing the alteration to the communication configuration.

8. The UE of claim 7, wherein the one or more processors are further configured to:
   forgo one or more communication procedures during the continuing to use the machine learning model.

9. The UE of claim 1, wherein the one or more processors are further configured to:
   fall back to another procedure for determining the one or more network parameters based at least in part on identifying the failure associated with the machine learning prediction.

10. The UE of claim 9, wherein the one or more processors, to fall back, are configured to:
    fall back based at least in part on at least one of:
    a pre-configured fall back configuration, or
    received signaling from the base station.

11. The UE of claim 1, wherein the one or more processors are further configured to:
    receive, from the base station, information identifying an alteration to a configuration of a machine learning model;
    reconfigure the machine learning model based at least in part on the information identifying the alteration to the configuration of the machine learning model; and
    use the machine learning model for a subsequent prediction based at least in part on reconfiguring the machine learning model.

12. The UE of claim 1, wherein the one or more processors are further configured to:
    forgo use of a machine learning model for predicting the one or more network parameters for a threshold period of time.

13. The UE of claim 1, wherein the one or more processors, to report the failure information, are configured to:
    report the failure information to cause an alteration to a configuration of another UE.

14. The UE of claim 1, wherein the failure information reported to the base station includes information identifying a timing of the failure associated with the machine learning prediction for the one or more network parameters.

15. The UE of claim 1, wherein the failure information reported to the base station includes information identifying the predicted value for the one or more network parameters and the observed value for the one or more network parameters.

16. The UE of claim 1, wherein the failure information reported to the base station includes information identifying the differential between the predicted value for the one or more network parameters and the observed value for the one or more network parameters.

17. A base station for wireless communication, comprising:
- a memory; and
- one or more processors, coupled to the memory, configured to:
  - receive, from a user equipment (UE), a report of failure information regarding a failure associated with a machine learning prediction for determining one or more network parameters, wherein the one or more processors are configured to receive the report in response to a threshold quantity of occurrences of a differential, between a predicted value for the one or more network parameters and an observed value for the one or more network parameters, satisfying a threshold within a threshold period of time; and
  - transmit, to the UE, response information identifying an alteration to a communication configuration as a response to the failure associated with the machine learning prediction.

18. The base station of claim 17, wherein the one or more processors are further configured to:
- transmit parameter information or configuration information associated with configuring a machine learning model.

19. The base station of claim 17, wherein the failure information includes information identifying at least one of: the failure, a timing of the failure, an input that triggered the failure, an output from the failure, or an observed network parameter.

20. The base station of claim 17, wherein the one or more processors, to receive the report of the failure information, are configured to:
- receive a scheduling request;
- transmit downlink information identifying a grant for reporting; and
- receive the failure information using a resource identified in the grant.

21. The base station of claim 17, wherein the failure information includes information identifying a proposed set of network parameters associated with the failure.

22. The base station of claim 17, wherein the one or more processors are further configured to:
- transmit signaling instructing the UE to fall back to another procedure for determining the one or more network parameters based at least in part on identifying the failure associated with the machine learning prediction.

23. The base station of claim 17, wherein the one or more processors are further configured to:
- transmit, to the UE, information identifying an alteration to a configuration of a machine learning model.

24. The base station of claim 17, wherein the one or more processors are further configured to:
- transmit information to another UE to adjust another communication configuration of the other UE.

25. The base station of claim 24, wherein the one or more processors, to transmit the information to the other UE, are configured to:
- transmit the information to the other UE based at least in part on receiving the failure information.

26. The base station of claim 24, wherein another report of failure information has not been received from the other UE.

27. A method of wireless communication performed by a user equipment (UE), comprising:
- identifying a failure associated with a machine learning prediction for one or more network parameters, wherein identifying the failure associated with the machine learning prediction comprises:
  - determining a differential between a predicted value for the one or more network parameters and an observed value for the one or more network parameters;
  - determining that the differential satisfies a threshold;
  - determining a threshold quantity of occurrences of the differential satisfying the threshold within a threshold period of time; and
  - identifying the failure associated with the machine learning prediction based at least in part on determining the threshold quantity of occurrences of the differential satisfying the threshold within the threshold period of time;
- reporting, to a base station, failure information regarding the failure associated with the machine learning prediction;
- receiving, from the base station, response information identifying an alteration to a communication configuration as a response to the failure associated with the machine learning prediction; and
- implementing the alteration to the communication configuration based at least in part on receiving the response information.

28. The method of claim 27, further comprising:
- receiving parameter information or configuration information associated with configuring a machine learning model; and
- computing the machine learning prediction for the one or more network parameters based at least in part on receiving the parameter information or the configuration information.

29. A method of wireless communication performed by a base station, comprising:
- receiving, from a user equipment (UE), a report of failure information regarding a failure associated with a machine learning prediction for determining one or more network parameters, wherein receiving the report comprises receiving the report in response to a threshold quantity of occurrences of a differential, between a predicted value for the one or more network parameters and an observed value for the one or more network parameters, satisfying a threshold within a threshold period of time; and
- transmitting, to the UE, response information identifying an alteration to a communication configuration as a response to the failure associated with the machine learning prediction.

30. The method of claim 29, further comprising:
- transmitting parameter information or configuration information associated with configuring a machine learning model.

* * * * *